United States Patent
Je

(10) Patent No.: US 9,281,767 B2
(45) Date of Patent: Mar. 8, 2016

(54) MOTOR DRIVING APPARATUS

(71) Applicant: MANDO CORPORATION, Pyeongtaek-si, Gyeonggi-do (KR)

(72) Inventor: Kyu Yeong Je, Yongin-si (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 0 days.

(21) Appl. No.: 14/253,993

(22) Filed: Apr. 16, 2014

(65) Prior Publication Data

US 2014/0306632 A1  Oct. 16, 2014

(30) Foreign Application Priority Data

Apr. 16, 2013  (KR) .................. 10-2013-0041750

(51) Int. Cl.
*H02P 6/18* (2006.01)
*H02P 29/02* (2006.01)

(52) U.S. Cl.
CPC .............. *H02P 6/182* (2013.01); *H02P 29/021* (2013.01)

(58) Field of Classification Search
CPC .............. G09G 3/3688; G09G 3/3614; G09G 2310/027; G09G 3/369; H03F 3/45475
See application file for complete search history.

(56) References Cited

U.S. PATENT DOCUMENTS

| | | | | |
|---|---|---|---|---|
| 4,980,727 A * | 12/1990 | Stelter | ............. | G03G 15/0855 399/64 |
| 6,307,337 B1 * | 10/2001 | Nelson | ............. | H02K 5/15 318/286 |
| 7,330,129 B2 * | 2/2008 | Crowell | ............. | B25B 23/14 318/479 |

FOREIGN PATENT DOCUMENTS

| | | |
|---|---|---|
| DE | 10303267 A1 | 7/2003 |
| DE | 102004022005 A1 | 12/2005 |
| DE | 102007057746 A1 | 6/2008 |
| KR | 10-2006-0007557 A | 1/2006 |
| WO | 2004077657 A1 | 9/2004 |

OTHER PUBLICATIONS

German Office Action for application No. 10 2014 005 874.3 dated Jul. 18, 2014.

* cited by examiner

*Primary Examiner* — Shawki S Ismail
*Assistant Examiner* — Zoheb Imtiaz
(74) *Attorney, Agent, or Firm* — Hauptman Ham, LLP

(57) ABSTRACT

Disclosed herein is a motor driving apparatus including: an actuator for converting electric energy into rotary motion; a monitoring unit for monitoring a state of the actuator; a control unit for generating a control signal based on an output voltage of the monitoring unit; and a driving signal generation unit for generating a driving signal for the actuator based on the control signal. The control unit may determine whether the monitoring unit normally operates, based on an output voltage of the monitoring unit.

11 Claims, 6 Drawing Sheets

- Related Art -

MOTOR DRIVING APPARATUS

CROSS-REFERENCE(S) TO RELATED APPLICATIONS

This application claims priority to Korean Patent Application No. 10-2013-0041750, filed on Apr. 16, 2013, the disclosure of which is incorporated herein by reference in its entirety.

BACKGROUND OF THE INVENTION

1. Field of the Invention

Exemplary embodiments of the present invention relate to a motor driving apparatus, and more particularly, to a motor driving apparatus which is capable of reliably monitoring an operating state of a motor, that is, a motor driving apparatus which is capable of observing a monitoring circuit for monitoring an operating state of a motor in real time, and thus determining whether the monitoring circuit normally operates.

2. Description of the Related Art

Currently, an apparatus for electronically controlling a steering apparatus of a vehicle has been generalized, and has so far progressed a lot. The electronic steering apparatus having no mechanical link between a steering apparatus and wheels may convert information on torque, speed, and direction of the steering apparatus into an electrical signal, and directly controls the wheels based on the electrical signal. Since there is no mechanical link between the steering apparatus and the wheels, a function for controlling the steering apparatus may be freely added. That is, a function for optimizing a driver's feel, a self-adjustment function, or a variable gear ratio may be easily and economically accomplished.

The electronic control for a steering apparatus may be performed through an electronic control unit (ECU). The electronic control method using such a processor is required to secure reliability, in order to minimize a malfunction. Furthermore, since the process for controlling wheels through the ECU is performed by a brushless AC (BLAC) motor, it is more important to secure reliability, in order to minimize a malfunction of the BLAC motor. Since a malfunction of the BLAC motor is a large risk factor in operation stability, research has been conducted on a method for preventing a malfunction.

Conventionally, the electronic steering apparatus includes a BLAC motor and a fail-safe DC motor. When the BLAC motor fails, the DC motor is operated according to the control of the ECU, and thus guarantees the performance of the electronic steering apparatus.

In such a system, the BLAC motor requires instantaneous torque control, and the position information of a rotor is needed for the instantaneous torque control. The position information of the rotor may be detected through a hall sensor which is a position sensor mounted in the BLAC motor. However, since the hall sensor is expensive, research has been conducted on a method for detecting the position information of the rotor without a hall sensor.

In the conventional method, since the initial angle of the rotor cannot be acquired and the reliability of a circuit to monitor the position information of the rotor cannot be sufficiently secured, the BLAC motor is likely to instantly malfunction. In order to solve such a problem during initialization, research has been conducted on a method using both of the DC motor and the BLAC motor.

Korean Patent Laid-open Publication No. 10-2006-0007557 has disclosed a method for calculating a reference angle in an electronic steering system which includes a BLAC motor and a fail-safe DC motor. The method calculates a reference angle of a motor in consideration of fail and safe, when an electronic steering apparatus of a vehicle is operated. This method is characterized in that the electronic steering apparatus is initially driven through the motor and the BLAC motor is then driven. At this time, the ECU detects a counter electromotive force caused by the BLAC motor, and calculates the reference angle.

In such a structure, however, when a monitoring circuit for detecting a counter electromotive force has no reliability, a malfunction may occur in the operation of the BLAC motor. Thus, according to a conventional method, two monitoring circuits having the same configuration are used to verify the reliability of the monitoring circuits. In this case, the detection results of the monitoring circuits are compared to determine whether a failure occurred.

FIG. 6 is a configuration diagram of a conventional motor driving apparatus.

As illustrated in FIG. 6, the conventional motor driving apparatus includes an actuator 100, a control unit 200, a monitoring unit 300, and a driving signal generation unit 400. The actuator 100 converts electric energy into rotary motion. The control unit 200 analyzes information of a monitoring circuit so as to control the actuator 100. The monitoring unit 300 is positioned between the actuator 100 and the control unit 200 so as to monitor the state of the actuator 100. The driving signal generation unit 400 is positioned between the actuator 100 and the control unit 200 so as to generate a driving signal for driving the actuator 100 according to the control of the control unit 200.

The actuator 100 for converting electric energy into rotary motion uses a BLAC motor. The BLAC motor is used when an electronic steering apparatus transmits motion of a steering apparatus to wheels. The BLAC motor is characterized in that it may be driven without a brush.

That is, the BLAC motor has a structure in which a coil for receiving electricity is not attached to a rotor but attached to a stator, and a magnet is attached to the rotor. A conventional motor can change the direction of a current, supplied to a coil according to rotation, through a brush. However, the BLAC motor is required to detect the rotation angle of the rotor, in order to change the direction of a current based on rotation.

The rotation angle of the BLAC motor may be detected through a hall sensor at each of phases U, V, and W of the BLAC motor. The hall sensor refers to a sensor capable of detecting a current which is generated in proportion to the change in magnetic field of a conductor through which a current is passed. The current change of the hall sensor may indicate the change in magnetic field of the BLAC motor, and the rotation angle of the rotor may be calculated through the change in magnetic field. However, when the hall sensor is attached, the internal structure of the BLAC motor may become complex. Thus, there has been used a method for detecting the rotation angle of a rotor by detecting the change in current of a coil without a hall sensor.

That is, in order to acquire the rotation angle of the rotor inside the BLAC motor, the current of the coil of the stator inside the BLAC motor may be detected to estimate the rotation angle. The current outputted from the coil may be used to detect a counter electromotive force generated through the BLAC motor. The counter electromotor force may be used to acquire the rotation angle of the rotor.

The control unit 200 serves to analyze the information of the monitoring unit 300 so as to control the actuator 100. The control unit 200 may control the actuator 100 by analyzing a counter electromotive force of the actuator 100. The rotation angle of the actuator 100 may be acquired from the counter electromotive force (voltage) of the actuator 100, and a rotation angle to be controlled later may be set on the basis of the torque, direction and speed of the steering apparatus.

Furthermore, the control unit 200 may determine whether the monitoring unit 300 normally operates. At this time, two or more monitoring units 300 may be additionally provided, and outputs of the respective monitoring units 300 may be compared to determine whether a failure occurred or not. The control unit 200 may use a microprocessor and a digital signal processor (DSP) to calculate the reliability.

The monitoring unit 300 is positioned between the actuator 100 and the control unit 200 so as to monitor the state of the actuator 100, and serves to measure a current of each phase extracted from the actuator 100.

At this time, a shunt resistor is used to measure the current. The shunt resistor is connected in series to the coil of the BLAC motor. Since a resistor has a characteristic of consuming a current flowing therein into heat, a shut resistor having a small resistance value may be selectively used. However, as the resistance value decreases, an error may occur in a measured current due to the influence of surrounding noise. Thus, the shunt resistor may be selected in consideration of the resistance value. The current measured through the shunt resistor is converted into a voltage and then supplied to the control unit 200.

The driving signal generation unit 400 is positioned between the actuator 100 and the control unit 200, and generates a driving signal for operating the actuator 100 according to the control of the control unit 200. The driving signal generation unit 300 is controlled through positive control and negative control.

The actuator 100 controls a load of the motor, which is divided into three phases including phase U, phase V, and phase W. The actuator 100 is driven in a different manner depending on the internal configuration thereof. In general, the actuator 100 independently controls current supply for each phase, in order to perform positive control and negative control for each phase. The current control may be performed through an FET, and a high-power switching circuit using an FET may be provided. The switching circuit is independently used to supply a positive voltage and a negative voltage to each of the phase U, the phase V, and the phase W. That is, the switching circuit may include a positive voltage supply switching circuit and a negative voltage supply switching circuit for the phase U, a positive voltage supply switching circuit and a negative voltage supply switching circuit for the phase V, and a positive voltage supply switching circuit and a negative voltage supply switching circuit for the phase W.

In such a method, however, the size of the monitoring circuit and the number of parts in the monitor circuit may be increased, while power consumption is increased. Thus, there is a demand for a structure capable of determining whether a failure occurred, using one monitoring circuit.

[Patent Document] Korean Patent Laid-open Publication No. 10-2006-0007557

SUMMARY OF THE INVENTION

The present invention has been made in view of the above problems, and it is an object of the present invention to provide a motor driving apparatus and method capable of monitoring whether a monitoring circuit for monitoring an operating state of a BLAC motor normally operates, through a simple structure.

It an another object of the present invention to provide a motor driving apparatus and method capable of periodically monitoring whether a monitoring circuit normally operates, using only one monitoring circuit, thereby reducing the size, the number of parts, and power consumption.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, a motor driving apparatus may include: an actuator for converting electric energy into rotary motion; a monitoring unit for monitoring a state of the actuator; a control unit for generating a control signal based on an output voltage of the monitoring unit; and a driving signal generation unit for generating a driving signal for the actuator based on the control signal. The control unit may determine whether the monitoring unit normally operates, based on an output voltage of the monitoring unit.

The actuator may use a BLAC motor.

The BLAC motor may have no hall sensor provided therein.

The monitoring unit may include one or more shunt resistors for measuring a counter electromotive force of the actuator.

The monitoring unit may include an op-amp for adjusting an amplification ratio so as to convert and amplify a current of the actuator into a voltage.

The output voltage of the monitoring unit may include an offset voltage which is adjusted to be positioned in the center of the range of voltages supplied to the control unit.

The offset voltage may be provided using an op-amp based on a voltage follower.

The control unit may check the output voltage of the monitoring unit at each predetermined cycle.

The predetermined cycle may include a predetermined period in which no current is supplied from the actuator.

When the output voltage of the monitoring unit is different from a preset offset voltage, the control unit may determine whether a failure occurred.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

The terms or words used in the present specification and claims must not be limited to typical or dictionary meanings, but analyzed as meanings and concepts which coincide with the spirit of the present invention, based on the principle that the present inventor can properly define the concepts of the terms in order to describe the invention in the best way.

Thus, configurations illustrated in the embodiments and drawings of the present invention are only examples, and do not necessarily represent the spirit of the present invention. Thus, various equivalents and modifications capable of replacing the configurations may be provided at the time of filing the present application.

Hereafter, the exemplary embodiments of the present invention will be described below in more detail with reference to the accompanying drawings.

Figure 1:
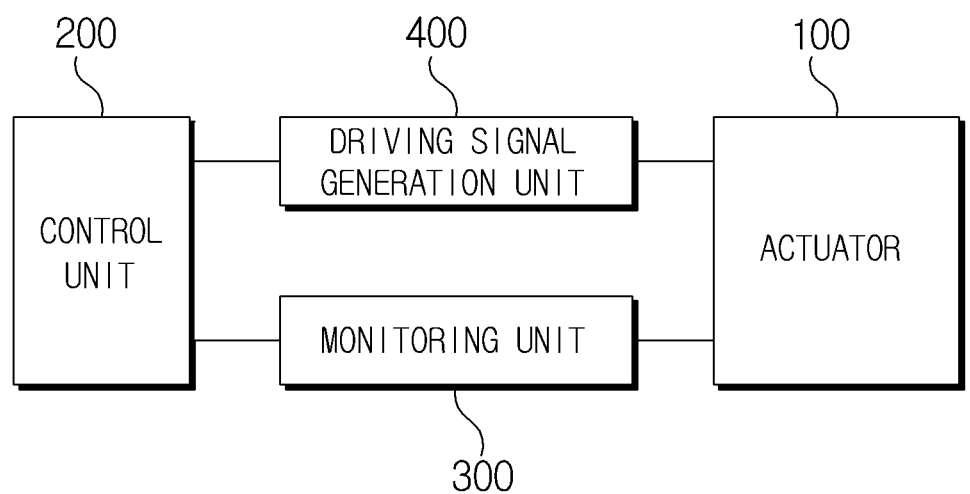
FIG. 1 is a configuration diagram of a motor driving apparatus according to an embodiment of the present invention.

FIG. 1 is a configuration diagram of a motor driving apparatus according to an embodiment of the present invention.

As illustrated in FIG. 1, the motor driving apparatus according to the embodiment of the present invention may include an actuator 100, a control unit 200, a monitoring unit 300, and a driving signal generation unit 400. The actuator 100 converts electric energy into rotary motion. The control unit 200 analyzes the information of the monitoring unit 300 so as to control the actuator 100. The monitoring unit 300 may be positioned between the actuator 100 and the control unit 200 so as to monitor the state of the actuator 100. The driving signal generation unit 400 may be positioned between the actuator 100 and the control unit 200 so as to generate a driving signal for driving the actuator 100 according to the control of the control unit 200.

The actuator 100 serves to convert electric energy into rotary motion, and may include a BLAC motor. The BLAC motor is used when an electronic steering apparatus transmits motion of a steering apparatus to wheels. The BLAC motor is characterized in that it is driven without a brush.

That is, the BLAC motor has a structure in which a coil for receiving electricity is not attached to a rotor but attached to a stator, and a magnet is attached to the rotor. A conventional motor can change the direction of a current, supplied to a coil according to rotation, through a brush. However, the BLAC motor is required to detect the rotation angle of the rotor, in order to change the direction of a current based on rotation.

The rotation angle of the BLAC motor may be detected through a hall sensor at each of phases U, V, and W of the BLAC motor. The hall sensor refers to a sensor capable of detecting a current which is generated in proportion to the change in magnetic field of a conductor through which a current is passed. The current change of the hall sensor may indicate the change in magnetic field of the BLAC motor, and the rotation angle of the rotor may be calculated through the change in magnetic field. However, when the hall sensor is attached, the internal structure of the BLAC motor may become complex. Thus, there has been used a method for detecting the rotation angle of a rotor by detecting the change in current of a coil without a hall sensor.

That is, in order to acquire the rotation angle of the rotor inside the BLAC motor, the current of the coil of the stator inside the BLAC motor may be detected to estimate the rotation angle. The current outputted from the coil may be used to detect a counter electromotive force generated through the BLAC motor. The counter electromotor force may be used to acquire the rotation angle of the rotor.

The control unit 200 serves to analyze the information of the monitoring unit 300 so as to control the actuator 100. The control unit 200 may control the actuator 100 by analyze a counter electromotive force of the actuator 100. The rotation angle of the actuator 100 may be acquired from the counter electromotive force (voltage) of the actuator 100, and a rotation angle to be controlled later may be set on the basis of the torque, direction and speed of the steering apparatus.

Furthermore, the control unit 200 checks an offset voltage and an output voltage of the monitoring unit 300, in order to determine whether the monitoring unit 300 normally operates. The control unit 200 periodically measures the offset voltage and the output voltage while no current is supplied from the actuator 100.

The monitoring unit 300 is positioned between the actuator 100 and the control unit 200 so as to monitor the state of the actuator 100, and serves to measure a current of each phase extracted from the actuator 100.

At this time, a shunt resistor is used to measure the current. The shunt resistor is connected in series to the coil of the BLAC motor. Since a resistor has a characteristic of consuming a current flowing therein into heat, a shut resistor having a small resistance value may be selectively used. However, as the resistance value decreases, an error may occur in a measured current due to the influence of surrounding noise. Thus, the shunt resistor may be selected in consideration of the resistance value. The current measured through the shunt resistor is converted into a voltage and then supplied to the control unit 200.

The driving signal generation unit 400 is positioned between the actuator 100 and the control unit 200 so as to generate a driving signal for operating the actuator 100 according to the control of the control unit 200. The driving signal generation unit 400 is controlled through positive control and negative control.

The actuator 100 controls a load of the motor, which is divided into three phases including phase U, phase V, and phase W. The actuator 100 is driven in a different manner depending on the internal configuration thereof. In general, the actuator 100 independently controls current supply for each phase, in order to perform positive control and negative control for each phase. The current control may be performed through an FET, and a high-power switching circuit using an FET may be provided. The switching circuit is independently used to supply a positive voltage and a negative voltage to each of the phase U, the phase V, and the phase W. That is, the switching circuit may include a positive voltage supply switching circuit and a negative voltage supply switching circuit for the phase U, a positive voltage supply switching circuit and a negative voltage supply switching circuit for the phase V, and a positive voltage supply switching circuit and a negative voltage supply switching circuit for the phase W.

Figure 2:
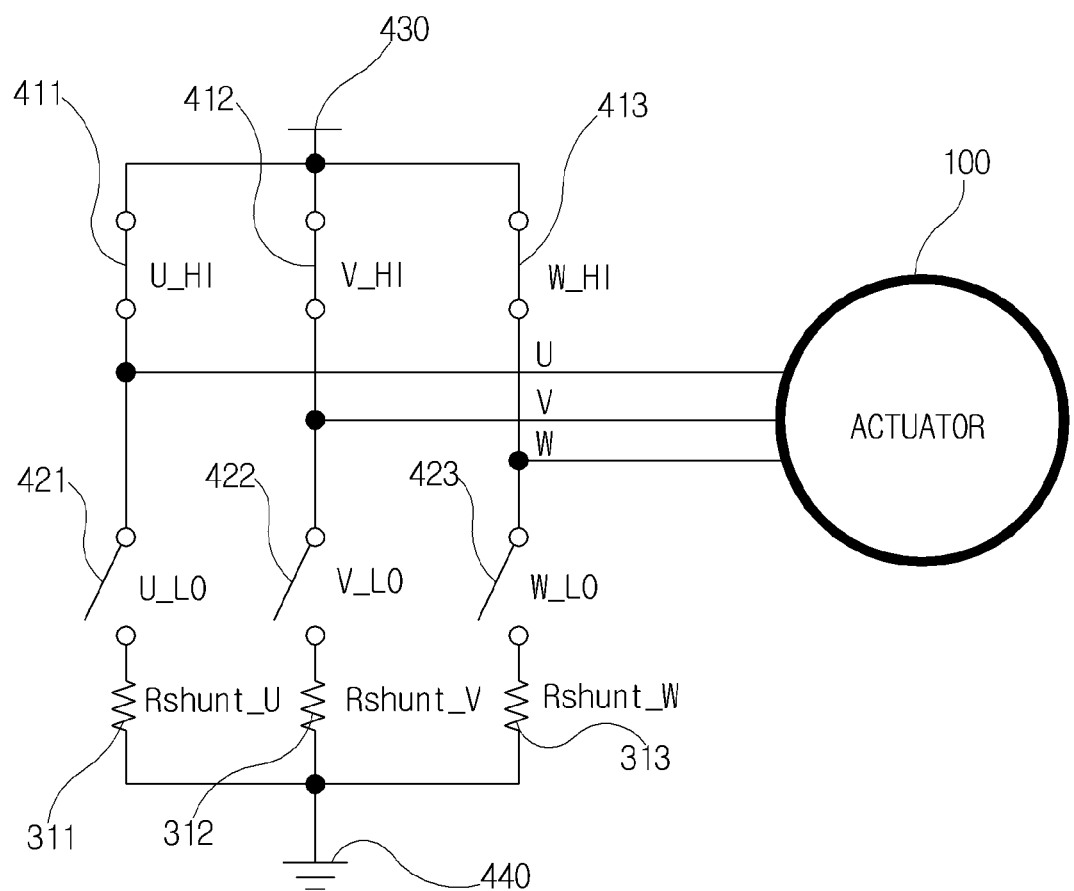
FIG. 2 is a circuit diagram illustrating a partial configuration of a monitoring unit and the detailed configuration of a driving signal generation unit of FIG. 1.

FIG. 2 is a circuit diagram illustrating a partial configuration of the monitoring unit 300 and the detailed configuration of the driving signal generation unit 400 of FIG. 1.

As illustrated in FIG. 2, positive control 411 U_HI for the phase U is to apply a positive power supply for controlling the phase U of the actuator. The positive control 411 U_HI changes the magnetic field of the stator inside the actuator 100. Furthermore, the positive control 411 U_HI is performed in the opposite manner to negative control 421 U_LO for the phase U such that a positive power supply 430 of the actuator and a negative power supply 440 of the actuator are not shorted to each other.

The negative control 421 U_LO for the phase U is to apply a negative power supply for controlling the phase U of the actuator. The negative control 421 U_LO changes the magnetic field of the stator inside the actuator 100. Furthermore, the negative control 421 U_LO is performed in the opposite manner to the positive control 411 U_HI for the phase U such that the positive power supply 430 of the actuator and the negative power supply 440 of the actuator are not shorted to each other.

The shunt resistor 311 for the phase U is inserted to detect a current for the phase U of the actuator. At this time, a shun resistor having as a small value as possible may be used to reduce power consumption, and a proper value may be selected so as not to receive the influence of surrounding noise during detection.

Furthermore, positive control 421 V_HI for the phase V is to apply a positive power supply for controlling the phase V of the actuator. The positive control 421 V_HI changes the magnetic field of the stator inside the actuator 100. The positive control 421 V_HI for the phase V is performed in the opposite manner to negative control 422 V_LO for the phase V such that the positive power supply 430 of the actuator and the negative power supply 440 of the actuator are not shorted to each other.

The negative control 422 V_LO for the phase V is to apply a negative voltage for controlling the phase V of the actuator. The negative control 422 V_LO changes the magnetic field of the stator inside to the actuator 100. The negative control 422 V_LO is performed in the opposite manner to the positive control 412 V_HI for the phase V such that the positive power supply 430 of the actuator and the negative power supply 440 of the actuator are not shorted to each other.

The shunt resistor 312 for the phase V is inserted to detect a current for the phase V of the actuator. At this time, a shun resistor having as a small value as possible may be used to reduce power consumption, and a proper value may be selected so as not to receive the influence of surrounding noise during detection.

Furthermore, positive control 413 W_HI for the phase W is to apply a positive power supply for controlling the phase W of the actuator, and changes the magnetic field of the stator inside the actuator 100. The positive control 413 W_HI is performed in the opposite manner to negative control 423 W_LO for the phase W such that the positive power supply 430 of the actuator and the negative voltage 440 of the actuator are not shorted to each other.

The negative control 423 W_LO for the phase W is to apply a negative power supply for controlling the phase W of the actuator, and changes the magnetic field of the stator inside the actuator 100. The negative control 423 W_LO is performed in the opposite manner to the positive control 413 W_HI for the phase W such that the positive power supply 430 of the actuator and the negative voltage 440 of the actuator are not shorted to each other.

The shunt resistor 313 for the phase V is inserted to detect a current for the phase W of the actuator. At this time, a shun resistor having as a small value as possible may be used to reduce power consumption, and a proper value may be selected so as not to receive the influence of surrounding noise during detection.

The positive power supply 430 of the actuator serves to supply a positive voltage to drive the actuator. The positive voltage is supplied as a DC voltage. That is, a counter electromotive force of the coil inside the BLAC motor is generated as an AC voltage, but the supply voltage is supplied as a DC voltage. In other words, although the supply voltage is supplied as a DC voltage to the BLAC motor, a counter electromotive force current generated in the coil through electromagnetic induction between the rotor and the stator is an alternating current.

The negative power supply 440 of the actuator serves to supply a negative voltage to drive the actuator, and is connected to GND. When an application of the BLAC motor uses a negative voltage, the positive power supply 430 of the actuator may be connected to GND, and the negative power supply 440 of the actuator may be connected to the negative voltage instead of GND.

Figure 3:
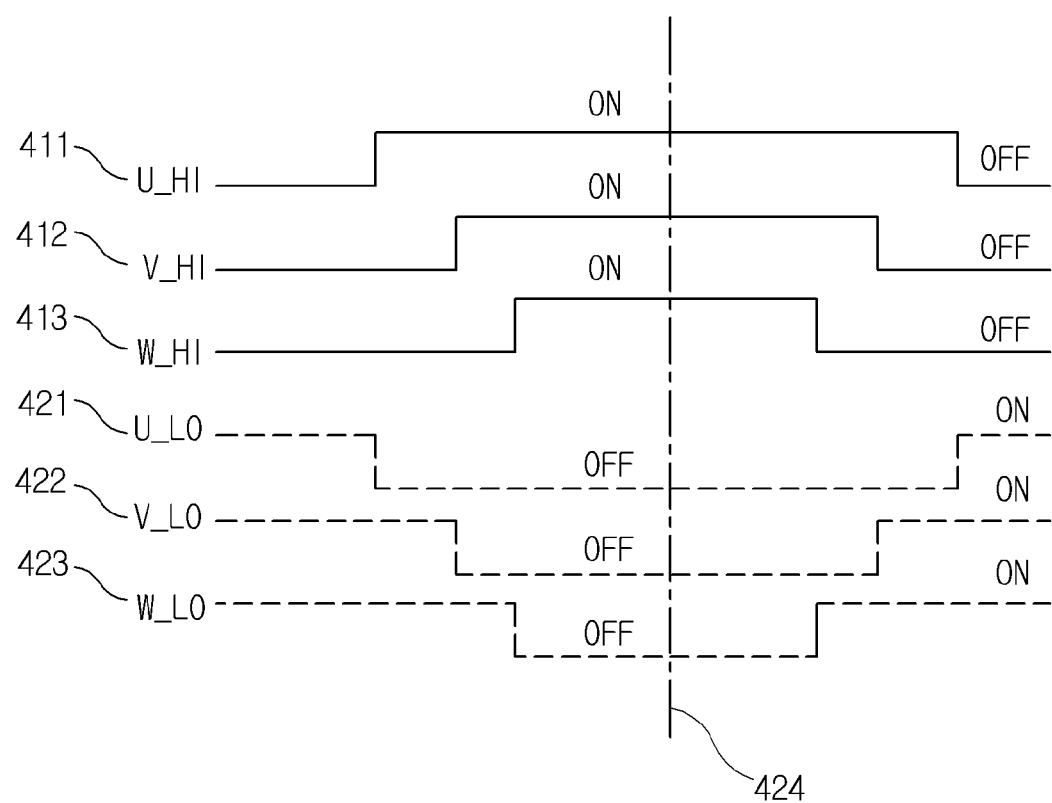
FIG. 3 is a timing diagram illustrating control signals of the driving signal generation unit of FIG. 2.

FIG. 3 is a timing diagram illustrating control signals of the driving signal generation unit 400 of FIG. 2.

As illustrated in FIG. 3, the positive control 411 U_HI for the phase U is to apply a positive voltage for controlling the phase U of the actuator. When the positive control 411 U_HI is turned on, the positive voltage is supplied, and when the positive control 411 U_HI is turned off, the positive voltage is opened.

The negative control 421 U_LO for the phase U is to apply a negative voltage for controlling the phase U of the actuator, and performed in the opposite manner to the positive control 411 U_HI for the phase U such that the positive power supply 430 of the actuator and the negative power supply 440 of the actuator are not shorted to each other.

Thus, when the negative control 421 U_LO for the phase U is turned on, the shunt resistor is connected to the actuator 100. However, when the negative control 421 U_LO for the phase U is turned off, the shunt resistor is opened to the actuator 100, and no signals are applied to the shunt resistor. Thus, it is possible to check whether a current amplification circuit normally operates, without the influence of the actuator 100.

The positive control 412 V_HI for the phase V is to apply a positive voltage for controlling the phase V of the actuator. When the positive control 412 V_HI is turned on, the positive voltage is supplied, and when the positive control 412 V_HI is turned off, the positive voltage is opened.

The negative control 422 V_LO for the phase V is to apply a negative voltage for controlling the phase V of the actuator, and performed in the opposite manner to the positive control 412 V_HI such that the positive power supply 430 of the actuator and the negative power supply 440 of the actuator are not shorted to each other.

Thus, when the negative control 422 V_LO for the phase V is turned on, the shunt resistor is connected to the actuator 100. However, when the negative control 422 V_LO for the phase V is turned off, the shunt resistor is opened to the actuator 100, and no signals are applied to the shunt resistor. Thus, it is possible to check whether the current amplification circuit normally operates, without the influence of the actuator.

The positive control 413 W_HI for the phase W is to apply a positive voltage for controlling the phase W of the actuator. When the positive control 413 W_HI is turned on, the positive voltage is supplied, and when the positive control 413 W_HI is turned off, the positive voltage is opened.

The negative control 423 W_LO for the phase W is to apply a negative power supply for controlling the phase W of the actuator. The negative control 423 W_LO is performed in the opposite manner to the positive control 413 W_HI for the phase W such that the positive power supply 430 of the actuator and the negative power supply 440 of the actuator are not shorted to each other.

Thus, when the negative control 423 W_LO for the phase W is turned on, the shunt resistor is connected to the actuator 100. However, when the negative control 423 W_LO for the phase W is turned off, the shunt resistor is opened to the actuator 100, and no signals are applied to the shunt resistor. Thus, it is possible to check whether the current amplification circuit normally operates, without the influence of the actuator.

A failure detection time 424 is a time point for checking whether a failure occurred in the monitoring circuit, and a time point at which none of the phases U, V, and W of the actuator 100 are connected to the shunt resistor may be selected as the failure detection time 424. At the failure detection time 424, the control unit 200 may periodically determine whether the monitoring unit 300 normally operates.

The motor driving apparatus according to the embodiment of the present invention periodically detects an offset voltage of the monitoring circuit at each failure detection time 424, and determine whether a failure occurred in the monitoring circuit. Hereinafter, the method in which the monitor driving apparatus detects an offset voltage to determine whether the monitoring circuit normally operates will be described in detail.

Figure 4:
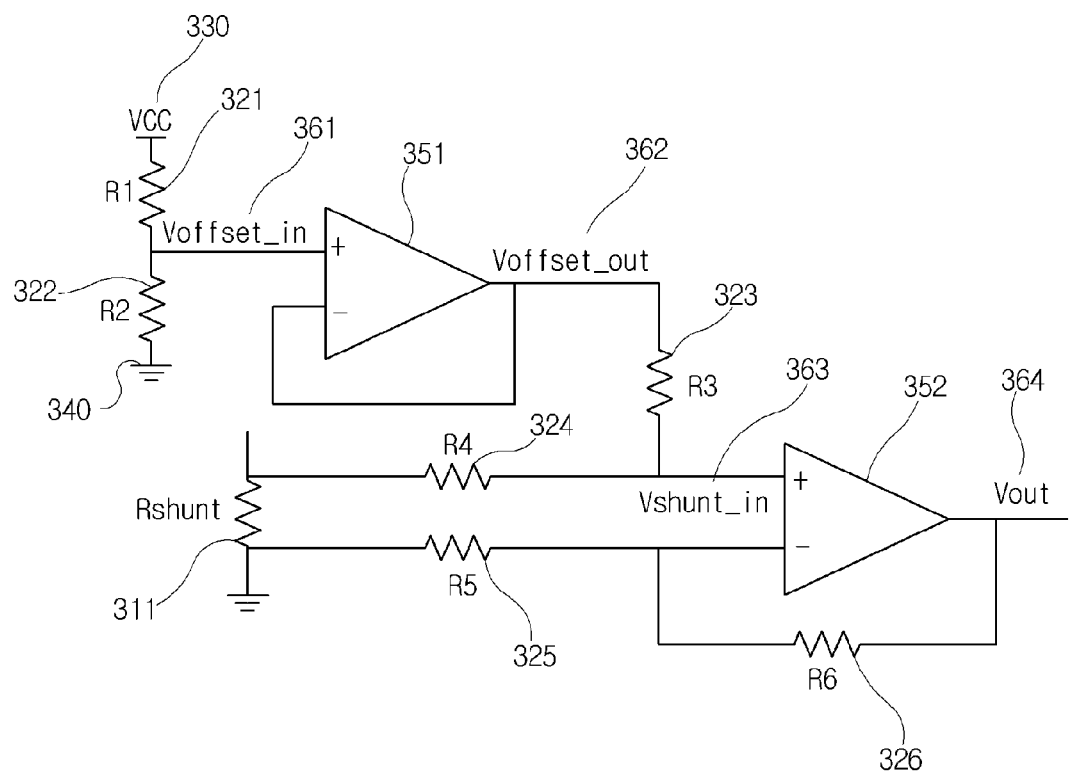
FIG. 4 is a circuit diagram of the monitoring unit of FIG. 1.

FIG. 4 is a circuit diagram of the monitoring unit 300 of FIG. 1.

As illustrated in FIG. 4, an op-amp positive power supply 330 (hereafter, represented by VCC) serves to supply a positive voltage to an offset supply op-amp 351, and is connected to a positive voltage to an offset resistor 321, an offset supply op-amp 351, and a gain control op-amp 352. The op-amp positive power supply VCC may be set to +5V which is used in the control unit 200 so as to facilitate the interface with the control unit 200.

An op-amp negative power supply 340 serves to supply a negative voltage to the offset supply op-amp 351, and is connected to an offset resistor 322, the offset supply op-amp 351, and the gain control op-amp 352. The op-amp negative power supply 340 may include GND. However, when a negative voltage is required due to the characteristic of the circuit, the negative voltage may be connected instead of GND.

The offset resistor 321 (hereafter, represented by R1) serves to provide a positive reference voltage to the offset supply op-amp 351, and is used to supply an offset voltage to the offset supply op-amp 351. The voltage supplied to the offset supply op-amp 351 may be set through a current which is determined together with the offset resistor 232, and expressed as VCC-(current flowing in R1)*R1.

The offset resistor 322 (hereafter, represented by R2) serves to provide a negative reference voltage to the offset supply op-amp 351, and is used to supply an offset voltage. The voltage supplied to the offset supply op-amp 351 may be set through a current which is determined together with the offset resistor R1, and expressed as (current flowing in R2)*R2.

Here, (current flowing in R2)=VCC/(R1+R2). The op-amp has a characteristic that no current is inputted thereto. Thus, since the current flowing in the offset resistor R1 is equal to the current flowing in the offset resistor R2, an offset voltage input 361 calculated through the offset resistor R1 is equal to an offset voltage input 361 calculated through the offset resistor R2.

The offset voltage input 361 (hereafter, represented by Voffset_in) is supplied as the offset voltage set through the offset resistors R1 and R2. The offset voltage input Voffset_in is current-amplified through the offset supply op-amp 351, and has a value of 2.5V when the offset resistors R1 and R2 have the same resistance value and the op-amp positive power supply VCC uses 5V. However, since the resistance values of the offset resistors R1 and R2 may be adjusted so that a shunt voltage output 364 is finally measured as 2.5V, the offset voltage input Voffset_in may be slightly different from 2.5V. The offset voltage input Voffset_in set through the first and offset resistors R1 and R2 may be expressed as the following equation.

$$V\text{offset\_in} = \{R1/(R1+R2)\} * VCC$$

The offset supply op-amp 351 serves to supply an offset voltage to the gain control op-amp 352, and is a voltage follower. That is, the offset supply op-amp 351 is an op-amp through which a voltage inputted to the offset supply op-amp 351 is outputted as an offset voltage output 362 as it is. The voltage follower refers to an op-amp application which has a characteristic that it has no variation in supply voltage even through a load variation occurs in output, and is usually used for isolation function.

The offset voltage output 362 (hereafter, represented by Voffset_out) has the same value as the offset voltage input Voffset_in, and set through the circuit configuration around the offset supply op-amp 351. That is, the op-amp has a characteristic that the voltage of the positive input terminal of the op-amp is fed back to the negative terminal as it is. At this time, since the negative input of the offset supply op-amp 351 is connected to the offset voltage output Voffset_out, the offset voltage output Voffset_out may be applied as the offset voltage input Voffset_in. This may be expressed by the following equation.

$$V\text{offset\_out} = V\text{offset\_in}$$

A gain control resistor 323 (hereafter, represented by R3) serves to provide an offset voltage to a positive input terminal of the gain control op-amp 352, and is used to supply an offset voltage to the gain control op-amp 352. The voltage of the offset voltage output Voffset_out is set through the current which is determined together with a gain control resistor 324. When supposing that the shunt resistor 311 for the phase U has a very small value, the influence of the shunt resistor 311 for the phase U may be ignored. Thus, a shunt voltage input 363 may be expressed as Voffset_out−(current flowing in R3)*R3.

The shunt resistor 311 for the phase U is inserted to detect a current for the phase U of the actuator. At normal times, the shunt resistor 311 is used to measure the current of the phase U of the actuator. However, since the shunt resistor 311 for the phase U and the actuator are not connected to each other at the failure detection time 424, the shunt resistor 311 may be replaced with a short circuit.

The gain control resistor 324 (hereafter, represented by R4) serves to provide a feedback voltage of the actuator to the positive input terminal of the gain control op-amp 352. At normal times, the gain control resistor R4 is used to measure the current of the phase U of the actuator, like the shunt resistor 311 for the phase U. However, since the shunt resistor 311 for the phase U and the actuator are not connected to each other at the failure detection time 424, the influence of the shunt resistor 311 of the phase U may be ignored, and the gain control resistor R4 may be replaced with connection to GND.

That is, the shunt voltage input 363 may be expressed as (current flowing in R4)*R4.

Here, (current flowing in R4)=Voffset_out/(R3+R4). Thus, the shunt voltage input 363 calculated through the gain control resistor R3 is equal to the shout voltage input 363 calculated through the gain control resistor R4.

The shunt voltage input 363 (hereafter, represented by Vshunt_in) is set through the sum of the offset voltage output 362 and a voltage output corresponding to the feedback current of the actuator, and supplied to the gain control op-amp 352. The shunt voltage input Vshunt_in is voltage-amplified through the gain control op-amp 352. At normal times, the offset voltage output Voffset_out and the operating voltage of the actuator are amplified together. At the failure detection time 424, however, the shunt voltage input Vshunt_in is used as an input for amplifying only the offset voltage output Voffset_out. Thus, the shunt voltage input Vshunt_in may be expressed as the following equation.

$$V\text{shunt\_in} = \{R4/(R3+R4)\} * V\text{offset\_out}$$

The gain control op-amp 352 serves to amplify an offset voltage or convert the current of the actuator into a voltage. At the failure detection time 424, the gain control op-amp 352 amplifies only the offset voltage output Voffset_out.

The op-amp has a characteristic that the voltage of the positive input terminal thereof is fed back to the negative input terminal thereof. Thus, since the positive input of the gain control op-amp 352 is the shut voltage input Vshunt_in and the negative input of the gain control op-amp 352 is connected to the output of the offset supply op-amp 351, the offset voltage input Voffset_in may be applied as a shut voltage output 364.

A gain control resistor 352 (hereafter, represented by R5) serves to provide a negative voltage to the negative input terminal of the gain control op-amp 352, and has a resistance value set through a current flowing therein. However, since the op-amp has a characteristic that the negative voltage input is equal to the positive voltage input, the current flowing in the gain control resistor R5 may be calculated through the shunt voltage input Vshunt_in corresponding to the positive voltage input. Thus, the current flowing in the gain control resistor R5 may be expressed as Vshunt_in/R5. Since the op-amp has a characteristic that no current is introduced as an input thereof, the current may flow into a gain control resistor 326.

The gain control resistor 326 (hereafter, represented by R6) serves to provide a feedback voltage to the negative input terminal of the gain control op-amp 352, and has a resistance value set through a current flowing therein. In reality, the negative voltage input of the gain control op-amp 352 is the shunt voltage input Vshunt_in and the current flowing in the gain control resistor R5 corresponds to Vshunt_in/R5. Thus, a voltage difference across the gain control resistor R6 may be expressed as {Vshunt_in/R5}*R6.

A shunt voltage output 364 (hereafter, represented by Vout) is obtained by controlling the gain of the shunt voltage input Vshunt_in, and provided as a voltage for detecting whether the monitoring circuit normally operates. The above-described equations may be summarized as follows.

$$V\text{out} = \{(R5+R6)/R5\} * V\text{shunt\_in}$$

$$V\text{out} = \{R2/(R1+R2)\} * \{R4/(R3+R4)\} * \{(R5+R6)/R5\} * VCC$$

The equations are summarized at the failure detection time 424, and R=R2, R3=R6, and R4=R5 are set so that the shunt voltage output Vout is finally detected as VCC/2V. In the present embodiment, R1 or R2 may be initially adjusted to make up for an offset which occurs due to the characteristic of the op-amp.

In the present embodiment, when the shunt voltage output Vout is detected as VCC/2V during the operation for determining whether a failure occurred in the monitoring unit 300, it may be determined that the monitoring unit 300 normally operates. That is, when an abnormality occurs in the op-amplifier and the resistor influencing the shunt voltage output Vout, the shunt voltage output Vout may differ. Thus, it is possible to determine whether the monitoring unit 300 normally operates. In the case of EPS (Electric Power Steering) of a vehicle, an internal between the failure detection times 424 may be set to about 62.5 μsec, which makes it possible to rapidly determine whether the monitoring circuit normally operates.

Figure 5:
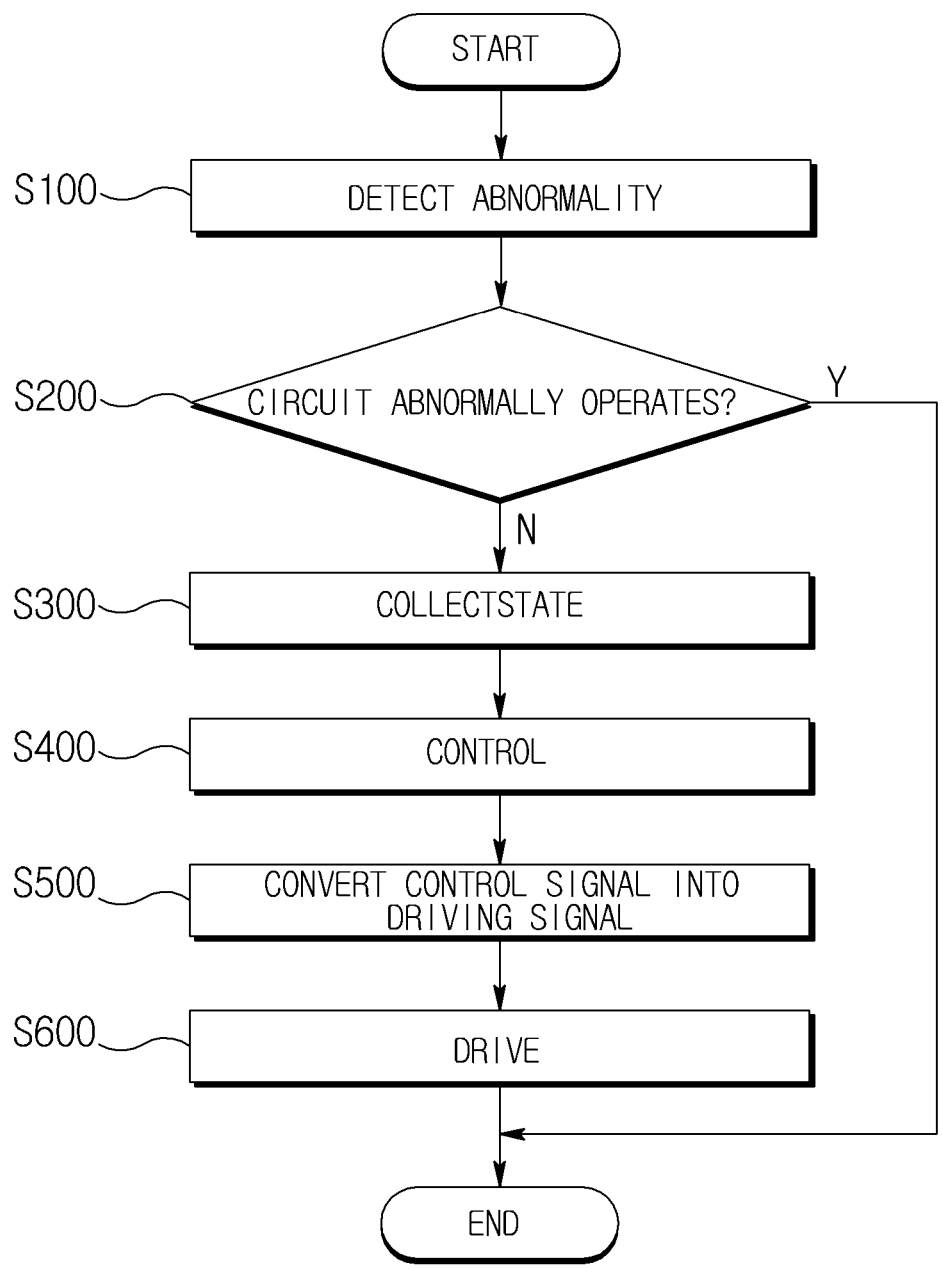
FIG. 5 is a flowchart illustrating a motor driving method according to an embodiment of the present invention.
Figure 6:
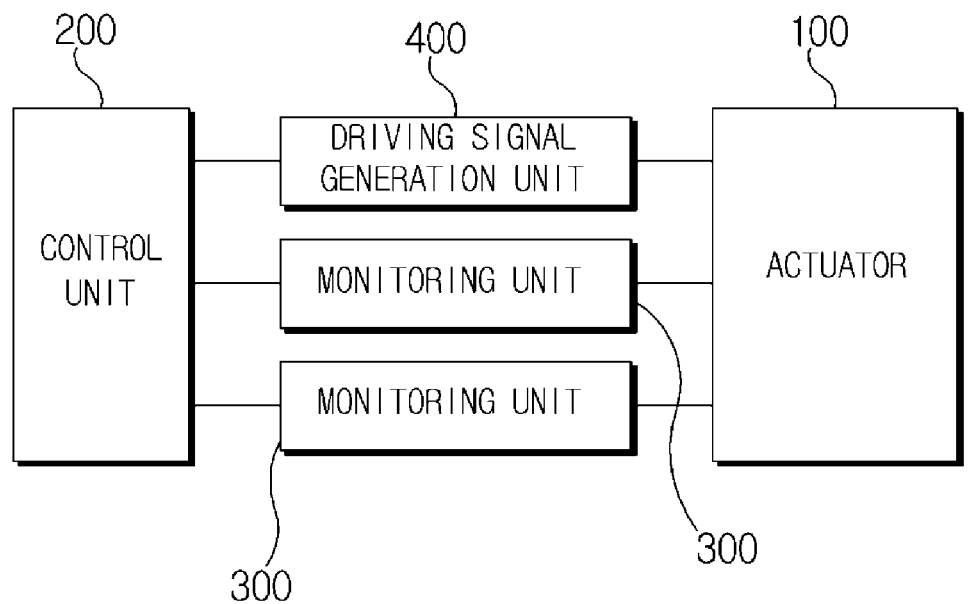
FIG. 6 is a configuration diagram of a conventional motor driving apparatus.

FIG. 5 is a flowchart illustrating a motor driving method according to an embodiment of the present invention.

As illustrated in FIG. 5, the motor driving method according to the embodiment of the present invention includes detecting whether an abnormality occurred in the monitoring unit 300 at step S100, comparing the detection results to determine whether the monitoring unit 300 normally operates at step S200, collecting a state of the actuator 100, generating a control signal for controlling the actuator 100 at step S400, converting the control signal into a driving signal for driving the actuator at step S500, and driving the actuator according to the driving signal at step S600.

At step S100 for detecting whether an abnormality occurred in the monitoring unit 300, the control unit 200 measures an output of the monitoring unit 300 at the failure detection time 424. As the measurement result, when the output of the monitoring unit 300 at the failure detection time 424 is VCC/2V, the control unit 200 determines that the monitoring unit 300 normally operates, and when the output is not VCC/2V, the control unit 200 determines that the monitoring unit 300 abnormally operates. As the determination result at step 200, when there is no abnormality, the control unit 200 drives the actuator 100. However, when there is an abnormality, the control unit 200 does not control the actuator 100 because the actuator 100 may cause a malfunction.

At step S300 for collecting the state of the actuator 100, the rotation angle of the rotor of the actuator 100 is estimated.

The estimation of the rotation angle may be performed by detecting and extracting a counter electromotive force flowing in each of U, V, and W phases. The BLAC motor has three phases, that is, U, V, and W phases, and each of the phases serves as a load. When a positive voltage is applied to the U, V, and W phases, the loads formed with coils generate magnetic fields, and serve as a magnet. At this time, when the positive voltage is changed to a negative voltage, the reverse current flows through the coils so as to recover the generated magnetic fields. Then, a counter electromotive force is generated. Thus, the counter electromotive force may be measured and estimated when the positive voltage applied to each of the U, V, and W phases is changed into the negative voltage.

Furthermore, the actuator 100 includes a rotor formed with a magnet, and the rotor is rotated to induce a current into the U, V, and W loads serving as a stator through electromagnetic induction. Thus, the current measured through the monitoring unit 300 is set to the sum of the induced current and the counter electromotive force flowing when the negative voltage is connected. Depending on the rotation angle of the rotor, a different current is electromagnetically induced. According to the rotation speed of the rotor, the electromagnetically induced current further increases. When the two kinds of currents are analyzed, the rotation speed as well as the current rotation angle may be estimated.

At step S400 for generating a control signal for controlling the actuator 100, the control unit 200 generates a signal for controlling the rotation angle of the actuator 100 based on the rotation angle estimated at step S300 and information on torque, speed, and direction inputted from the steering apparatus.

At step S500 for converting the generated control signal into a driving signal for driving the actuator, a switching circuit including an FET is used. The switching circuit is controlled to separate the control signal generated at step S400 into a positive voltage application signal and a negative voltage application signal having U, V, and W phases.

The actuator 100 is driven according to the driving signal having U, V, and W phases at step S600. The U, V, and W phases indicate three-phase loads, and a phase difference of 120 degrees is set between the respective loads. Depending on the structure of the BLAC motor, the actuator 100 is drive in a different manner. As known from FIG. 3, the U, V, and W phases may be controlled according to the sequence of (+, +, +), (+, +, −), (+, −, −), (−, −, −), (+, −, −), (+, +, −), and (+, +, +).

The motor driving apparatus according to the embodiment of the present invention may monitor the monitoring circuit of the motor through a simple structure.

Furthermore, the motor driving apparatus according to the embodiment of the present invention may significantly reduce the size and the number of parts, and also reduce the power consumption.

While the present invention has been described with respect to the specific embodiments, it will be apparent to those skilled in the art that various changes and modifications may be made without departing from the spirit and scope of the invention as defined in the following claims.

What is claimed is:

1. A motor driving apparatus comprising:
an actuator configured to convert electric energy into rotary motion;
a monitoring unit configured to:
    monitor a state of the actuator;
    generate a first output voltage based on the state of the actuator and a first offset voltage; and
    generate a second output voltage independent of the state of the actuator, the second output voltage being based on a second offset voltage based on the first offset voltage;
a control unit configured to:
    determine if the monitoring unit is operating normally or abnormally based on a comparison of the second output voltage with the second offset voltage; and
    generate a control signal based on the determination of whether the monitoring unit is operating normally or abnormally; and
a driving signal generation unit configured to generate a driving signal for driving the actuator based on the control signal.

2. The motor driving apparatus according to claim 1, wherein the actuator comprises a BLAC motor.

3. The motor driving apparatus according to claim 2, wherein the BLAC motor has no hall sensor provided therein.

4. The motor driving apparatus according to claim 1, wherein the monitoring unit comprises one or more shunt resistors for measuring a counter electromotive force of the actuator.

5. The motor driving apparatus according to claim 1, wherein the monitoring unit comprises an op-amp for adjusting an amplification ratio so as to convert and amplify a current of the actuator into a voltage.

6. The motor driving apparatus according to claim 1, wherein the monitoring unit comprises one or more offset resistors configured to adjust the first offset voltage to be positioned in a center of a range of voltages supplied from a power source to the control unit.

7. The motor driving apparatus according to claim 6, wherein the monitoring unit comprises an op-amp configured to provide the first offset voltage based on a voltage follower.

8. The motor driving apparatus according to claim 1, wherein the control unit is configured to check the second output voltage of the monitoring unit at a predetermined cycle.

9. The motor driving apparatus according to claim 8, wherein the monitoring unit is configured to generate the first output voltage based on a current supplied from the actuator to the monitoring unit, and the predetermined cycle comprises a predetermined period in which no current is supplied from the actuator to the monitoring unit.

10. The motor driving apparatus according to claim 1, wherein the control unit is configured to determine the monitoring unit is operating abnormally if the second output voltage of the monitoring unit is different from a preset value based on the second offset voltage.

11. The motor driving apparatus according to claim 10, wherein the preset value is about half of a voltage supplied from a power source to the control unit at a time the control unit is configured to check the second output voltage of the monitoring unit.

* * * * *